US009651664B2

(12) United States Patent
Charlot et al.

(10) Patent No.: US 9,651,664 B2
(45) Date of Patent: May 16, 2017

(54) SPACE BASED AUGMENTATION SYSTEM ADAPTED FOR IMPROVING THE ACCURACY AND RELIABILITY OF DATA PROVIDED BY A SATELLITE NAVIGATION SYSTEM AND ASSOCIATED METHOD

(71) Applicant: THALES, Neuilly-sur-Seine (FR)

(72) Inventors: Bernard Charlot, Toulouse (FR); Gonzagues Bertin De La Hautiere, Toulouse (FR); Sebastien Trilles, Toulouse (FR)

(73) Assignee: Thales, Courbevoie (FR)

( * ) Notice: Subject to any disclaimer, the term of this patent is extended or adjusted under 35 U.S.C. 154(b) by 1259 days.

(21) Appl. No.: 13/646,112

(22) Filed: Oct. 5, 2012

(65) Prior Publication Data

US 2013/0088385 A1    Apr. 11, 2013

(30) Foreign Application Priority Data

Oct. 7, 2011    (FR) ...................... 11 03057

(51) Int. Cl.
*G01S 19/08* (2010.01)
*G01S 19/07* (2010.01)
(Continued)

(52) U.S. Cl.
CPC ............ *G01S 19/07* (2013.01); *G01S 5/0009* (2013.01); *G01S 19/02* (2013.01); *G01S 19/46* (2013.01);
(Continued)

(58) Field of Classification Search
CPC .......... G01S 19/02; G01S 19/07; G01S 19/08; G01S 19/05; G01S 5/0009; G01S 5/0081
(Continued)

(56) References Cited

U.S. PATENT DOCUMENTS 5,884,220 A * 3/1999 Farmer ................... G01S 19/41
                                                    342/357.44
7,126,937 B2 * 10/2006 Crosbie .................. H04B 7/269
                                                    370/331
(Continued)

OTHER PUBLICATIONS

J. Westbrook, et al, "Egnos Central Processing Facility Architecture and Design", GNSS 2000 Conference [Online], URL:http://www.egnos-pro.esa.int/Publications/GNSS%202000/GNSS2000_cpf.pdf>, May 4, 2000, pp. 1-7, XP002676599.

*Primary Examiner* — Chuong P Nguyen
(74) *Attorney, Agent, or Firm* — Baker Hostetler LLP (57) ABSTRACT

A space-based augmentation system improving the accuracy and reliability of satellite navigation system data includes, each at least: a ground station transmitting data to satellites, a ground station receiving signals transmitted by a satellite and by a satellite equipped with transmitting/receiving means for transmitting data received from the ground transmitting station for a given geographical area; two ground computing centers, redundantly and respectively calculating navigation message streams and transmitting to the ground transmitting station navigation message streams and information representative of Quality of Service provided by the system, from signals transmitted by the ground receiving stations. The computing centers, ground receiving station and ground transmitting station are connected by a communication network. The ground transmitting station selects navigation message streams of a master computing center according to information representative of respective Quality of Service of said computing centers, and said computing centers are synchronized on said master computing center.

13 Claims, 3 Drawing Sheets

(51) Int. Cl.
  *G01S 5/00*  (2006.01)
  *G01S 19/02*  (2010.01)
  *G01S 19/46*  (2010.01)
  *G01S 19/05*  (2010.01)

(52) U.S. Cl.
  CPC ............ *G01S 5/0081* (2013.01); *G01S 19/05* (2013.01); *G01S 19/08* (2013.01)

(58) Field of Classification Search
  USPC ........................................ 342/357.44, 357.45
  See application file for complete search history.

(56) References Cited

U.S. PATENT DOCUMENTS

| | | | |
|---|---|---|---|
| 7,647,173 B2* | 1/2010 | Charlot | G01S 19/07 342/357.29 |
| 8,193,978 B2* | 6/2012 | Moshfeghi | G01S 19/07 342/357.24 |
| 8,571,005 B1* | 10/2013 | Vleugels | G06F 5/16 370/350 |
| 9,154,216 B2* | 10/2015 | Trautenberg | H04B 7/18513 |
| 2002/0198657 A1* | 12/2002 | Robbins | G01S 5/009 701/469 |
| 2004/0088111 A1* | 5/2004 | Ahlbrecht | G01S 5/0009 701/471 |
| 2009/0121927 A1 | 5/2009 | Moshfeghi | |
| 2014/0035778 A1* | 2/2014 | Bertin De Le Hautiere | G01S 19/38 342/173 |

* cited by examiner

SPACE BASED AUGMENTATION SYSTEM ADAPTED FOR IMPROVING THE ACCURACY AND RELIABILITY OF DATA PROVIDED BY A SATELLITE NAVIGATION SYSTEM AND ASSOCIATED METHOD

CROSS-REFERENCE TO RELATED APPLICATION

This application claims priority to foreign French patent application No. FR 1103057, filed on Oct. 7, 2011, the disclosure of which is incorporated by reference in its entirety.

FIELD OF THE INVENTION

The present invention relates to a space based augmentation system adapted for improving the accuracy and reliability of data provided by a satellite navigation system and associated method.

BACKGROUND

Space Based Augmentation Systems or SBAS are satellite radio navigation systems intended to supplement systems providing a basic satellite navigation system or Global Navigation Satellite Systems GNSS, such as the GPS, GALILEO or GLONASS systems for jointly providing superior performance in terms of location accuracy, availability and continuity of service and integrity of the information provided.

These systems transmit an L-band signal on one or more (typically geostationary) satellites notably carrying a sequence of navigation or Navigation Overlay Frame NOF messages, at the rate of one message per second.

This signal and the transmitted message sequence are defined by an international standards document: RTCA MOPS DO229 currently in edition D "Minimum Operational Performance Standards for Global Positioning System/Wide Area Augmentation equipment".

Figure 1:
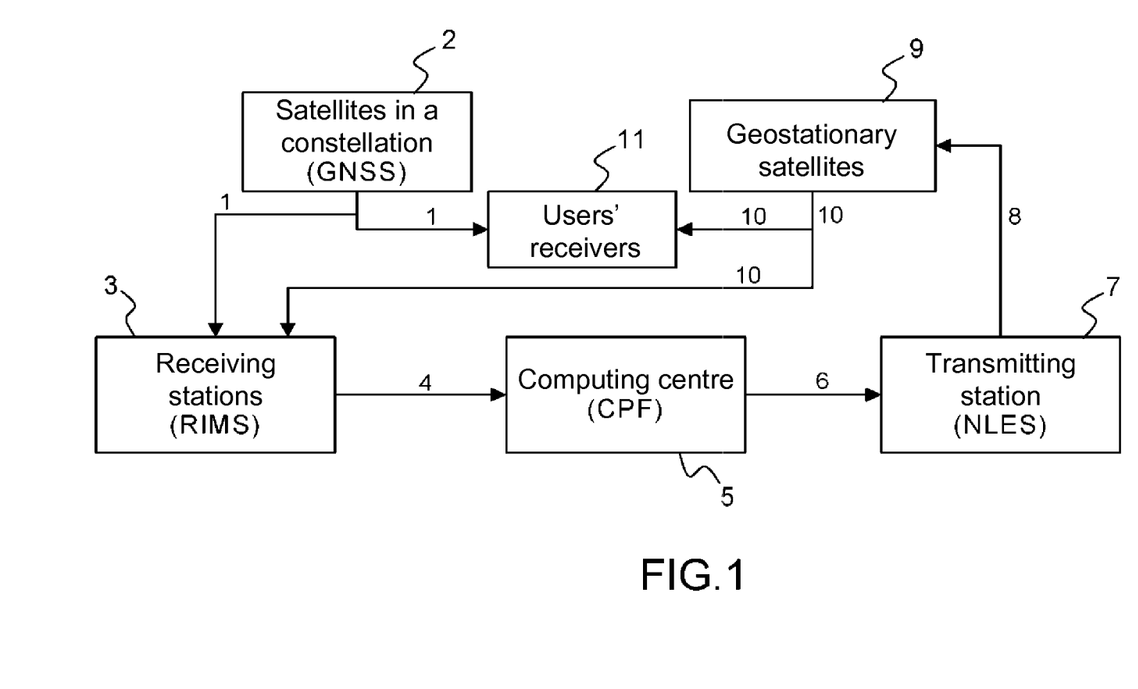
FIG. 1 schematically illustrates the basic architecture of a space based augmentation system.

The basic architecture of such a space based augmentation system is shown in FIG. 1.

The signal 1 transmitted by satellites 2 of a constellation of a GNSS satellite navigation system is received by a set of ground receiving stations 3, or Ranging and Integrity Monitoring Stations RIMS, dispersed over a wide area (e.g. Europe). These RIMS stations 3 transmit signals 4 corresponding to the signals received via a Wide Area Network or WAN, to a computing centre 5 or Central Processing Facility CPF. This computing centre 5 prepares corrections and integrity data for providing the user with the required performance and at each cycle transmits a part of them in the form of digital navigation or Navigation Overlay Frame NOF messages 6 which are transmitted via the wide area network to a ground transmitting station 7 or NLES, Navigation Land Earth Station. This ground transmitting station 7 transmits signals 8 corresponding to the signals received, to geostationary satellites 9 which rebroadcast them via signals 10 to receivers 11 of users of the service. The users' receivers 11 simultaneously receive these signals 10 and 1 from the generally geostationary SBAS satellites 9 and the signals from the satellites 2 of the GNSS satellite navigation system constellation and each calculate their position with the aid of these two types of signals 1 and 10. It should be noted that the RIMS ground receiving stations 3 also receive these signals 10 and that they transmit the NOF digital navigation messages to the CPF computing centre 5 jointly with the information received from the GNSS constellation satellites 2.

The cycle described above is repeatedly performed by the SBAS space based augmentation system typically every second. Implementation is often carried out as a pipeline, each element during one cycle processing the data to be processed by the next element in the following cycle.

It should be noted that at the level of the user, a NOF navigation message stream sequence of a certain length (typically several minutes) needs to be known for calculating their position. The consistency of the different NOF navigation message streams transmitted successively is therefore a major factor: which is why a NOF navigation message sequence is referred to as being transmitted, and not isolated NOF navigation messages.

Such a basic embodiment does not provide the very short-term availability and continuity expected by users of such a system: a typical availability of the order of 99% and a loss of continuity probability better than $10^{-5}$/h are characteristics of the expected performances for currently the most widespread use which is that of civil aviation.

Notably a failure in the main computing centre leads to the transmission of the NOF navigation message stream being interrupted and an immediate loss of continuity with an impact on availability.

Figure 2:
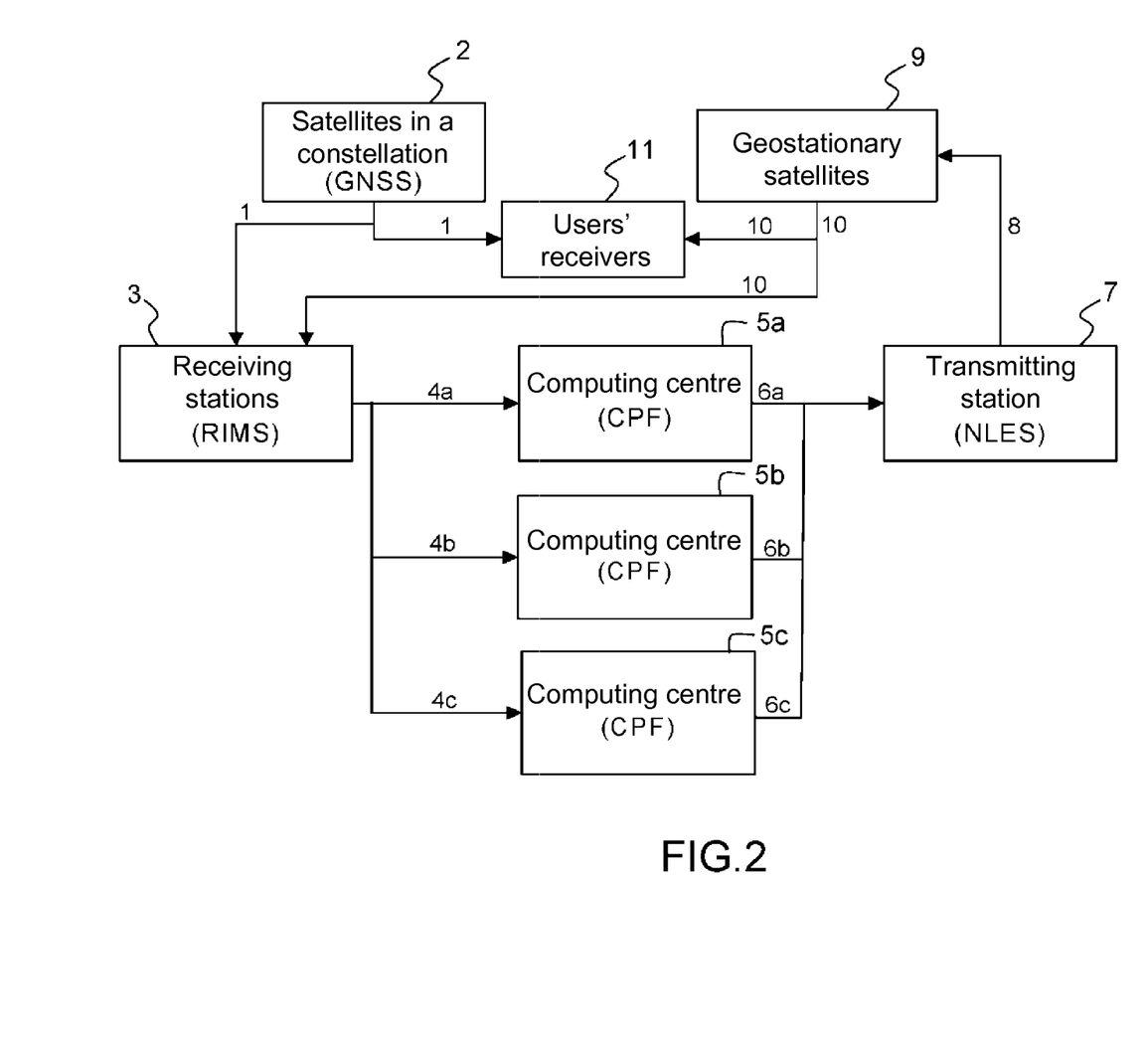
FIG. 2 schematically illustrates the EGNOS space based augmentation system.

SBAS space based augmentation systems with redundancy are known, such as the EGNOS system, as illustrated in FIG. 2.

Several computing centres or CPFs, in this case three CPFs 5a, 5b and 5c respectively receive data signals 4a, 4b and 4c in parallel from RIMS receiving stations and independently prepare their respective navigation message or NOF streams 6a, 6b and 6c which are each transmitted to the ground transmitting station or NLES 7. The ground transmitting station or NLES 7 selects one of these navigation message streams 8 from among message streams 6a, 6b or 6c and transmits it to users' receivers 11, in this case via the intermediary of geostationary satellites. In the event of a failure of one of the computing centres 5a, 5b and 5c, the ground transmitting station 7 or NLES selects the message from one of the other computing centres or CPFs, thus maintaining the continuity of transmission of navigation message or NOF streams to users' receivers. The process implemented by the ground transmitting station 7 or NLES is based on two things:

- the choice of computing centre or CPF supplying the navigation message or NOF stream ensuring the best performance for most users. This choice is based on an indicator or information representative of Quality of Service QoS established by each computing centre or CPF and transmitted to the NLES ground transmitting station; and
- two hysteresis mechanisms tending to prevent too frequent switching of computing centre from which the navigation message or NOF stream is selected when the information representative of Quality of Service QoS is comparable.

It should be noted that in this embodiment, the computing centres or CPFs 5a, 5b, and 5c are generally located at different geographical sites and at a distance in order to avoid a complete failure in the event of a major local problem (country-wide network failure, a major industrial accident, natural disaster, etc.).

The EGNOS conventional solution in FIG. 2 presents a major drawback. This is because each computing centre or CPF prepares navigation message or NOF streams, calculation cycle after calculation cycle, according to its own calculations. The message sequence generated by a computing centre or CPF is not the same as that generated by another computing centre.

This is because this message sequence depends on elements which are specific to each computing centre or CPF, even if these computing centres are functionally identical (same hardware and software):

input data: due to the imperfection of wide area networks, different computing centres or CPFs do not receive exactly the same input data. Some messages from receiving stations or RIMS are lost or delivered out of time preventing their inclusion in the current calculation cycle;

their start-up time: the calculations made by a CPF do not depend only on the data of the current cycle but also on intermediate variables, calculated from data received in previous cycles. The calculations of the computing centres or CPFs begin at this start-up time which is determined by operational considerations. These intermediate variables are therefore not calculated from the same history of past data and are therefore not necessarily identical for a given cycle; and the operational context: for example, for determining the SBAS time (virtual time acting as a common reference for all calculations in a CPF (ENT—EGNOS Network Time) in the case of EGNOS), the computing centre or CPF considers the clocks of some receiving stations or RIMS, at its start-up. If the network of receiving stations or RIMS available at the start-up of a computing centre is different from that corresponding to another computing centre, these two computing centres are synchronized on a virtual time based on a set of different clocks.

Because of the difference between these NOF navigation message sequences, when switching between the message sequence generated by a computing centre and that generated by the computing centre chosen by the NLES ground transmitting station for taking over, the problem arises of maintaining consistency between these message sequences.

In a system such as EGNOS, this has involved the need to introduce margins in some key parameters for preventing essential performance degradation (such as integrity) due to this switching between two sequences of independently generated messages. These margins reduce the normal performance of the system outside periods of switching between computing centres.

Another drawback is associated with current systems seeking to minimize this very unfavourable effect. This is possible by means of:

the use of a high quality wide area network, itself implementing redundancies in data transmission, to the detriment of the cost of the system. Typically the use of a private network may be necessary for obtaining high quality transmission, difficult to achieve on commercial networks shared with other users;

the use of a long period of convergence of calculations of a computing centre after its initialization before using the outputs of this computing centre in the operational system, enabling it to regain a state closer to that of the computing centres started up before it. The computing centre is then declared operational and is selectable by an NLES ground transmitting station. This approach leads to operational difficulties, restarting a computing centre taking a significant time detrimental to the operation and efficient maintenance of the system.

Typically, the design of the EGNOS system provides for a convergence time of 72 hours.

SUMMARY OF THE INVENTION

One object of the invention is to overcome the aforementioned problems.

According to one aspect of the invention, a space based augmentation system is provided which is adapted for improving the accuracy and reliability of data provided by a satellite navigation system including:

at least one ground station for transmitting data to satellites, at least one ground station for receiving signals transmitted by at least one satellite of a navigation system and by at least one satellite equipped with transmitting/receiving means adapted for transmitting data received from the ground transmitting station intended for a given geographical area, and at least two ground computing centres, redundantly adapted for respectively calculating the navigation message streams and transmitting to the ground transmitting station the navigation message streams and information representative of the Quality of Service provided by the system, from signals transmitted by the ground receiving station or stations.

The computing centres, ground receiving station and ground transmitting station are connected by at least one communication network. The ground transmitting station is adapted for selecting the navigation message streams of a master computing centre according to the information representative of the respective Quality of Service of said computing centres, and in that said computing centres are synchronized on said master computing centre.

In the event of failure of the main computing centre, such a system is able to prevent an interruption in the transmission of navigation message or NOF streams and an immediate loss of continuity with an impact on availability.

In addition, the normal performance of the system during periods of switching between computing centres is not diminished.

Furthermore, restarting a computing centre is quick, since the need for a convergence period is eliminated.

Moreover, the cost of deployment and operation of the system is reduced since a wide area network of lesser quality may suffice.

In one embodiment, the system is adapted for continuously transmitting internal variables for synchronizing the master computing centre with the other computing centres.

This continuous transmission can be used for precise and fast synchronization of the non-master CPFs with the master CPF.

According to one embodiment, the computing centres are distributed by geographical centres, a geographical centre including at least two of said computing centres, said computing centres of a geographical centre being connected by two-way links of a local area network.

This can be used to obtain a quality of synchronization between several CPFs that does not depend on the wide area network, and is therefore tolerant of a possibly low quality of this network.

In one embodiment, said remote geographical centres are connected by wide area two-way communication networks.

This can be used to maintain redundancy if a given geographical site is affected by a major event (natural disaster, etc.).

According to one embodiment, the ground transmitting station is adapted for modifying the selection of the master computing centre, in a new selection cycle, by choosing the geographical centre then the computing centre of this geographical centre, the selected geographical centre being modified in the absence of any navigation message stream from the computing centres of this geographical centre, or in the presence of information representative of a respective Quality of Service below a threshold of the computing centres of this geographical centre.

This enables the continuity of messages sent to the user to be maximized, priority being given to switching between two CPFs of the same geographical site (therefore very well synchronized across the local area network) with respect to the other CPFs located at other sites (which may be less well synchronized).

System according to one of the preceding claims, in which the ground transmitting station is adapted for transmitting information representative of the master computing centre and its navigation message stream via the intermediary of a transmission network.

In one embodiment, said transmission network includes at least one transmission satellite, e.g. a geostationary one.

The use of a satellite makes it possible to cover a wide service area in an economically efficient way. A geostationary satellite has the advantage of covering a very large geographical area and is also able to be constant over time, in contrast to orbiting satellites. Other types of satellites are better suited to the coverage of specific areas such as the poles or specific users such as urban vehicles. Other modes of transmission can also be used for deploying the invention: for example and non-restrictively: ground radio networks, mobile telephony networks.

According to another aspect of the invention, a method is provided for improving the accuracy and reliability of the data provided by a satellite navigation system, comprising the steps of:
selecting the navigation message stream of a master computing centre according to information representative of the respective Quality of Service of at least two redundant ground computing centres, and
synchronizing computing centres on said master computing centre.

BRIEF DESCRIPTION OF THE DRAWINGS

The invention will be better understood from the study of some embodiments described by way of non-restrictive examples and illustrated by the accompanying drawings in which.

In all the figures, elements having the same references are similar.

DETAILED DESCRIPTION

Figure 3:
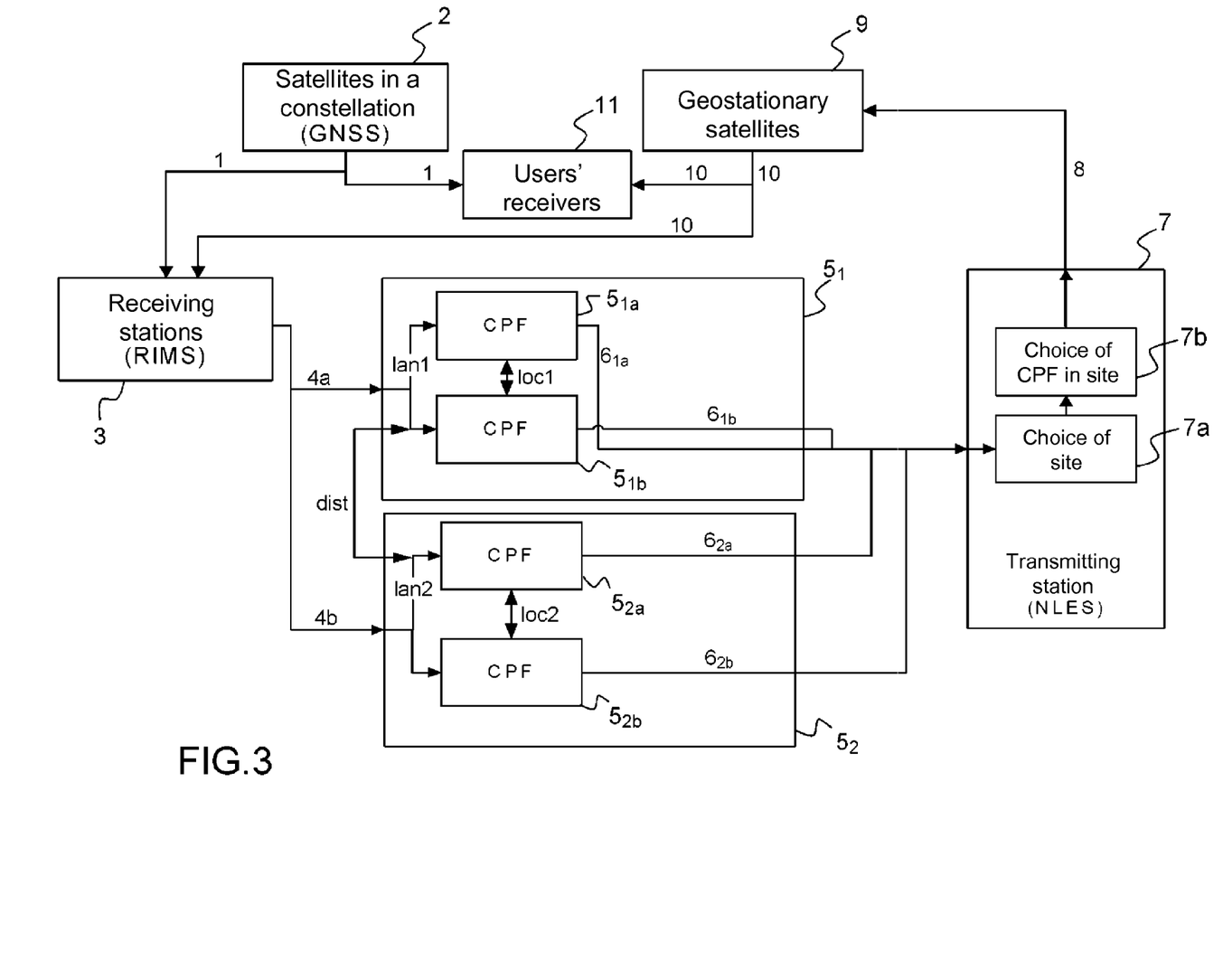
FIG. 3 schematically illustrates an embodiment of a space based augmentation system according to one aspect of the invention.

FIG. 3 shows a space based augmentation system adapted for improving the accuracy and reliability of the data provided by a satellite navigation system.

Several computing centres or CPFs, in this case four computing centres or CPFs $5_{1a}$, $5_{1b}$, $5_{2a}$ and $5_{2b}$ respectively receive data signals 4a and 4b in parallel from RIMS receiving stations and independently prepare their respective navigation message or NOF streams $6_{1a}$, $6_{1b}$, $6_{2a}$ and $6_{2b}$ which are each transmitted to the ground transmitting station or NLES 7. Computing centres $5_{1a}$ and $5_{1b}$ are in a first geographical area $5_1$ and computer centres $5_{2a}$ and $5_{2b}$ are in a second geographical area $5_2$. The ground transmitting station or NLES 7 selects one of these navigation message streams 8 from among message streams $6_{1a}$, $6_{1b}$, $6_{2a}$ and $6_{2b}$ and transmits it to users' receivers 11, in this case via the intermediary of geostationary satellites. In the event of failure of one of the computing centres $5_{1a}$, $5_{1b}$, $5_2$, and $5_{2b}$, the ground transmitting station 7 or NLES selects the message from one of the other computing centres or CPFs, thus maintaining the continuity of transmission of navigation message or NOF stream to users' receivers. The process implemented by the ground transmitting station 7 or NLES is based on two things:
the choice of computing centre or CPF supplying the navigation message or NOF stream ensuring the best performance for most users. This choice is based on an indicator or information representative of Quality of Service QoS established by each computing centre or CPF and transmitted to the ground transmitting station NLES 7; and
two hysteresis mechanisms tending to prevent too frequent switching of computing centre from which the navigation message or NOF stream is selected when the information representative of Quality of Service QoS is comparable.

It should be noted that in this embodiment, the computing centres or CPFs $5_{1a}$, $5_{1b}$, $5_{2a}$, and $5_{2b}$ are generally located at different geographical sites $5_1$, $5_2$ and at a distance to avoid a complete failure in the event of a major local problem (country-wide network failure, a major industrial accident, natural disaster, etc.).

The distribution of data from receiving stations or RIMS 3 arriving in a geographical area via the wide area network is then provided within the geographical area by a high performance local area network ensuring that the same data arrive at the computing centres.

Two-way links loc1 and loc2 over the local area networks are used for distributing master CPF internal data for synchronizing calculations of navigation message or NOF streams to the redundant CPF premises.

Two-way links on the wide area network dist are used for distributing master CPF internal data for synchronizing calculations of navigation message or NOF streams to the redundant remote CPFs.

The choice of the computing centre or CPF to be selected as master for the NOF navigation message stream of the cycle in progress, is made in the transmitting station or NLES 7 by first choosing the site that is selected, via a module for choosing a geographical site 7a, then choosing the CPF at this selected site, via a module for choosing a CPF at a site 7b. The choice of the geographical site is only compromised from one cycle to another if there is no selectable CPF at this site (no data or all the CPFs of the site are showing a Quality of Service QoS which is too low with respect to a given performance threshold).

During a computing cycle, a CPF computes the NOF navigation message stream of the cycle using as input:
the data received from the receiving stations or RIMS 3 for this cycle; and internal intermediate variables which result from calculations carried out in the preceding cycles according to necessary known methods in a space based augmentation system or SBAS.

Typically, these variables can be:

the previously broadcast NOF navigation message stream sequence (over the duration of the longest time out) or the dates of latest broadcasting of certain NOF navigation messages. This is necessary to ensure that the latest (time out) broadcast dates of certain messages are correctly observed. In a conventional architecture, the NOF navigation message sequence broadcast by the master CPF is already known to all the CPFs via feedback from the receiving stations or RIMS 3 ("RIMS raw data") and transmitting station or NLES 7 feedback ("NLES feedback"). It may therefore be pointless to duplicate these data in the inter-CPF synchronization link;

the computing context of the ionospheric model, which may include inter-frequency biases and associated covariances, hardware biases of different frequencies (L1, L2, etc.) and associated variances, vertical ionospheric delays and associated variances, and a model of overall consistency of the ionosphere;

the context of the satellite orbitography model, which may include the list of satellites visible from the network of receiving stations 3 and the information on associated manoeuvres, and the initial positions and velocities and reference time;

the synchronization context, which may include the configuration of the receiving stations or RIMS 3 used for determining the SBAS system timing clock time, from a subset of timing clocks typically those of receiving stations, and the estimation of the parameters of this composite timing clock and its variance.

These intermediate variables in their state at the preceding cycle are thus transmitted from the master CPF to the redundant CPFs which use them in their calculations of the current cycle. Since it is ensured that the data transmitted by the receiving stations or RIMS 3 received by the different CPFs of the same geographical site are identical due to the fact that the wide area network only ensures the transmission of data to a geographical site, the trans-site distribution being performed by a local area network over which it is possible to ensure a loss rate of virtually zero, it follows that the NOF navigation message stream calculated by the different CPFs of the same site is then the same.

The same mechanism is put in place for CPFs of another geographical site. However, the wide area transmission of this intermediate set of data may not be as perfect as on a local site and therefore causing limited desynchronizations between CPFs of different geographical sites. This explains the utility of also setting up a CPF selection function which favours switching between CPFs of the same site thus avoiding as far as possible switching to a CPF that may be less well synchronized.

The volume of data to be transmitted may be typically estimated at 50 Kbytes. A timing diagram of typical activity of a CPF in a system like EGNOS shows that the period of activity of the CPF in a cycle of 1s is currently only 750 ms. Thus there remain 250 ms in the cycle for transmitting the intermediate variables to other CPFs.

This is clearly sufficient over a local area network on which the typically necessary bit rate of about 200 Kbytes/s is easily attainable. Over wide area networks, compression techniques, e.g. differential encoding from one cycle to the other based on the frequency of variation currently recorded in these data, may be necessary for attaining the required timing diagram whilst keeping to acceptable network costs. For example, the current bit rate of a link between geographical sites on EGNOS is 512 kbits/s, which is not sufficient for direct transmission of the data considered every second. Compression factors of 2 to 10 are common using such mechanisms.

A particular point of synchronization between CPFs is the start-up sequence of a new CPF and its introduction into the operational chain, enabling its message to be selected by the transmitting station or NLES 7. Several cases should be distinguished:

start-up of the first CPF of the system: start-up will then be done conventionally with this CPF progressively reaching a convergence of its algorithms sufficient to be declared operational (selectable by the transmitting station or NLES 7);

start-up of another CPF of identical configuration: typically this is a restart after shutdown for maintenance or failure. This CPF first waits to be synchronized by the reception of intermediate data from the master CPF (which must therefore first have converged) for starting up. In the case of a master CPF that is already operational, the second CPF has a very short convergence time since it just has to wait the few cycles needed for receiving the synchronization data, it does not have to go through its own convergence period: this greatly reduces the impact of maintenance operations. In the case where the master CPF is located at the same site, the reception of these synchronization data only takes a single cycle. In the case of a master CPF at a remote site, and if data compression by difference between cycles is used for reducing the network bit rate, it may be necessary to wait several cycles for obtaining all the data. The compression algorithm used may limit this wait by using conventional data compression solutions, e.g. a tenth of all of the information to be transmitted is systematically sent every second in addition to the differentially encoded data stream so that all the data is refreshed at the end of a maximum of ten cycles, for a CPF starting up. For example, in the case of EGNOS where each cycle lasts one second, the start-up time is considerably reduced compared to the current seventy-two hours;

start-up of a CPF with a different configuration: this case is associated with the deployment of changes or corrections to the CPF. In this case, the objective of the deployment is obviously to obtain a behaviour of the CPF possibly different from that of the CPFs previously deployed. The way in which the CPF has to be placed in operation and the transition with the other CPFs deployed must therefore be defined in each case in the plan of deployment of the new version. In some cases, it may be necessary that this CPF performs its initialization independently and it may therefore prove useful to provide a choice of how a CPF starts up: either by synchronizing on the current master CPF, or by starting up independently. This can easily be implemented, for example, using a configuration variable or a mode change command parameter.

In a conventional SBAS space based augmentation system, the different computing centres or CPFs are distributed over different geographical sites. The technical justification of this distribution is essentially robustness to accidents or malicious acts: local loss of the wide area network, power failure, etc. In this context, the number of computing centres or CPFs per geographical site is not a very important characteristic. It may even be considered that the distribution of a single CPF per site is the most robust from this point of view.

In the present system, it is important on the other hand to have at least two computing centres or CPFs per geographical site in order to ensure that in most cases switching is done intra-site thereby ensuring the best synchronization between computing centres.

For example, the initial EGNOS architecture with four CPFs distributed over four sites (then reduced to three in the operational system), would be optimized by the present system through the distribution of the four CPFs in two sets of two CPFs at two different geographical sites. The characteristic of withstanding a major local problem is preserved whilst ensuring switching between CPFs from the same site in most cases.

Currently the selection allowing an NLES transmitting station to select a given CPF is based on:
the list of selectable CPFs for the current cycle: only the CPFs from which the NLES has received the message are selectable;
information representative of the Quality of Service QoS prepared by each CPF and giving an estimated average availability of the service for the users. The CPF with the best Quality of Service QoS is that tending to be selected by the transmitting station or NLES;
a hysteresis mechanism aimed at preventing too frequent switching between CPFs of similar Quality of Service QoS. This is made necessary to prevent performance loss from occurring at user level due to the differences between the calculations of the different CPFs.

The present system favours the choice of a new CPF located at the same site as the old one when switching (made necessary either by a master CPF failure, or by a network problem, or by a too low a Quality of Service QoS at a computing centre or CPF, or by a CPF mode change (explain)). The other operating characteristics may be maintained including hysteresis which may nevertheless prove useful for switching (much less frequent) between CPFs of different sites and also for stabilizing the system, facilitating its maintenance.

Local area networks are inherently much less prone to data loss or delays than wide area networks. Accordingly the conventional architecture of an Ethernet local area network, for example, already offers a very high level of confidence in the fact that any data from the receiving stations or RIMS arriving on site is correctly routed to the different CPFs of the site.

However, local area networks enable this quality to be simply augmented if necessary by different means. For example, a redundancy of the local area network links may be considered with duplication of data streams over the different links. Messages are duplicated at the source and the duplicates removed by the CPF receiving the messages.

The invention claimed is:

1. A space based augmentation system configured to improve an accuracy and reliability of data provided by a satellite navigation system, comprising:
at least one ground station for transmitting data to satellites,
at least one ground station for receiving signals transmitted by at least one satellite of a navigation system and by at least one satellite equipped with transmitting/receiving means configured to transmit data received from the at least one ground transmitting station intended for a given geographical area,
at least two ground computing centres, redundantly configured to respectively calculate navigation message streams and transmitting to the at least one ground transmitting station the navigation message streams and information representative of a Quality of Service provided by the system, from signals transmitted by the at least one ground receiving station,
said at least two ground computing centres, the at least one ground receiving station and the at least one ground transmitting station being connected by at least one communication network,
the at least one ground transmitting station being configured to select the navigation message streams of one of the at least two ground computing centres and designate that selected ground computing centre as a master computing centre according to the information representative of the respective Quality of Service of said at least two computing centres, and said computing centres being synchronized on said master computing centre.

2. The space based augmentation system according to claim 1, in which the system is configured to continuously transmit internal variables for synchronizing the master computing centre with the other computing centres.

3. The space based augmentation system according to claim 1, in which the computing centres are distributed by geographical centres, a geographical centre including at least two of said computing centres, said computing centres of a geographical centre being connected by two-way links of a local area network.

4. The space based augmentation system according to claim 3, in which said geographical centres are connected by wide area two-way communication networks.

5. A system according to claim 1, in which the ground transmitting station is configured to modify the selection of the master computing centre, in a new selection cycle, by choosing the geographical centre then the computing centre of said geographical centre, the selected geographical centre being modified in the absence of any navigation message stream from the computing centres of this geographical centre, or in the presence of information representative of a respective Quality of Service below a threshold of the computing centres of this geographical centre.

6. The system according to claim 1, in which the ground transmitting station is configured to transmit information representative of the master computing centre and its navigation message stream via the intermediary of a transmission network.

7. The system according to claim 6, in which said transmission network includes at least one transmission satellite.

8. The system according to claim 7, in which said transmission satellite is geostationary.

9. The space based augmentation system according to claim 1, in which the system is configured to continuously transmit internal variables for synchronizing calculations of navigation messages from the master computing centre to other computing centres of the at least two computing centres.

10. A method of improving an accuracy and reliability of data provided by a satellite navigation system, comprising:
selecting with at least one ground transmitting station a navigation message stream from one of at least two redundant ground computing centres and designating that selected one of the at least two redundant ground computing centres as a master computing centre, the selecting by the at least one ground transmitting station being based on information representative of a respective Quality of Service of the at least two redundant ground computing centres, receiving internal variables by other redundant ground computing centres of the at least two redundant ground computing centres from said master computing centre; and synchronizing the other redundant ground computing centres of the at least two redundant ground computing centres on the internal variables received from said master computing centre.

11. The method according to claim 10, further comprising continuously transmitting the internal variables from the master computing centre to the other ground computing centres of the at least two redundant ground computing centres.

12. The method according to claim 10, further comprising continuously transmitting the internal variables for synchronizing calculations of navigation messages from the master computing centre to the other ground computing centres of the at least two redundant ground computing centres.

13. A process of operating a space based augmentation system configured to improve an accuracy and reliability of data provided by a satellite navigation system, comprising:

providing at least one ground station for transmitting data to satellites;

providing at least one ground station for receiving signals transmitted by at least one satellite of a navigation system and by at least one satellite equipped with transmitting/receiving means configured to transmit data received from the at least one ground transmitting station intended for a given geographical area;

providing at least two ground computing centres, redundantly configured to respectively calculate navigation message streams and transmitting to the at least one ground transmitting station the navigation message streams and information representative of a quality of service provided by the system, from signals transmitted by the at least one ground receiving station;

connecting said at least two ground computing centres, the at least one ground receiving station and the at least one ground transmitting station by at least one communication network; and selecting, with the at least one ground transmitting station, the navigation message streams of one of the at least two ground computing centres and designating that selected ground computing centre as a master computing centre according to the information representative of the respective quality of service of said at least two computing centres, and said computing centres being synchronized on said master computing centre.

* * * * *